(12) United States Patent
Browder et al.

(10) Patent No.: US 12,518,452 B1
(45) Date of Patent: Jan. 6, 2026

(54) APPARATUS AND METHOD FOR GENERATING A GRAPHICAL INTERFACE WITH A DUAL-LAYER COMPONENT

(71) Applicant: Signet Health Corporation, North Richland Hills, TX (US)

(72) Inventors: Blake Browder, Dallas, TX (US); Joy Figarsky, Little Rock, AR (US)

(73) Assignee: Behavioral Health Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/963,452

(22) Filed: Nov. 27, 2024

(51) Int. Cl.
*G06T 11/60* (2006.01)
*G06F 9/451* (2018.01)
*G06N 3/08* (2023.01)

(52) U.S. Cl.
CPC .............. *G06T 11/60* (2013.01); *G06F 9/451* (2018.02); *G06N 3/08* (2013.01); *G06T 2200/24* (2013.01)

(58) Field of Classification Search
CPC ............ G06T 11/60; G06F 9/451; G06N 3/08
USPC ........................................................ 715/201
See application file for complete search history.

(56) References Cited

U.S. PATENT DOCUMENTS

| | | | |
|---|---|---|---|
| 10,115,172 B2 | 10/2018 | Goldberg et al. | |
| 12,153,941 B1 * | 11/2024 | Yim | G06F 16/9027 |
| 12,205,022 B2 * | 1/2025 | Sriharsha | G06F 16/245 |
| 2010/0088259 A1 * | 4/2010 | Valpola | G06N 3/08 706/14 |
| 2013/0218584 A1 | 8/2013 | Meier et al. | |
| 2015/0050630 A1 | 2/2015 | Hanlon | |
| 2017/0227944 A1 * | 8/2017 | Goli | G05B 19/05 |
| 2018/0197624 A1 * | 7/2018 | Robaina | A61B 5/1171 |
| 2022/0036177 A1 * | 2/2022 | Sriharsha | G06N 3/10 |
| 2023/0135659 A1 * | 5/2023 | Wu | G06N 3/044 706/21 |
| 2024/0096064 A1 * | 3/2024 | Li | G06V 10/82 |

FOREIGN PATENT DOCUMENTS

| | | |
|---|---|---|
| PT | 105496 A | 7/2012 |
| TW | 201545105 A | 12/2015 |

* cited by examiner

*Primary Examiner* — William D Titcomb
(74) *Attorney, Agent, or Firm* — Caldwell Intellectual Property Law

(57) ABSTRACT

An apparatus for a graphical interface with a dual-layer component includes at least a processor and a memory connected to the at least a processor, the memory containing instructions configuring the at least a processor to generate a content list data structure based on at least an element of initial data, identify, using the content list data structure, a plurality of display configuration modules, wherein the plurality of display configuration modules includes a streaming module and a dialog module, and configure a remote device to generate a plurality of display fields, each display field producing an output from an interface-level component of the plurality of interface-level components, wherein the plurality of display fields includes a first display field configured to display an output of the streaming module and a second display field configured to display an output of the dialog module and receive and input to the dialog module.

18 Claims, 7 Drawing Sheets

APPARATUS AND METHOD FOR GENERATING A GRAPHICAL INTERFACE WITH A DUAL-LAYER COMPONENT

FIELD OF THE INVENTION

The present invention generally relates to the field of graphical user interfaces. In particular, the present invention is directed to an apparatus and method for generating a graphical interface with a dual-layer component.

BACKGROUND

Graphical user interfaces can display dynamic data, but often do so using a static framework. However, information to be conveyed may have widely varying information density or comprehensibility, such that in some instances one form of GUI representation may be suitable for displaying such data, while in others it may be entirely unsuitable; this can lead to incomplete, confusing, or overly sparse displays, lowering comprehensibility.

SUMMARY OF THE DISCLOSURE

In an aspect an apparatus for a graphical interface with a dual-layer component includes at least a processor and a memory communicatively connected to the at least a processor, the memory containing instructions configuring the at least a processor to generate a content list data structure based on at least an element of initial data, identify, using the content list data structure, a plurality of display configuration modules, wherein the plurality of display configuration modules includes a streaming module and a dialog module, and configure a remote device to generate a plurality of display fields, each display field producing an output from an interface-level component of the plurality of interface-level components, wherein the plurality of display fields includes a first display field configured to display an output of the streaming module and a second display field configured to display an output of the dialog module and receive and input to the dialog module.

In another aspect a method of generating a graphical interface with a dual-layer component includes generating, by at least a processor, a content list data structure based on at least an element of initial data, identifying, by the at least a processor and using the content list data structure, a plurality of display configuration modules, wherein the plurality of display configuration modules includes a streaming module and a dialog module, and configuring, by the at least a processor, a remote device to generate a plurality of display fields, each display field producing an output from an interface-level component of the plurality of interface-level components, wherein the plurality of display fields includes a first display field configured to display an output of the streaming module and a second display field configured to display an output of the dialog module and receive and input to the dialog module.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the disclosed invention use a two-leveled user interface system in which a content list data structure is generated to indicate elements of data to be included in a display, and a plurality of display configuration modules are identified and/or selected based on the content list data structure. The plurality of display configuration modules are used to configure a remote device to display a plurality of display fields, which may output streaming content, perform interactive programs, or the like.

Figure 1:
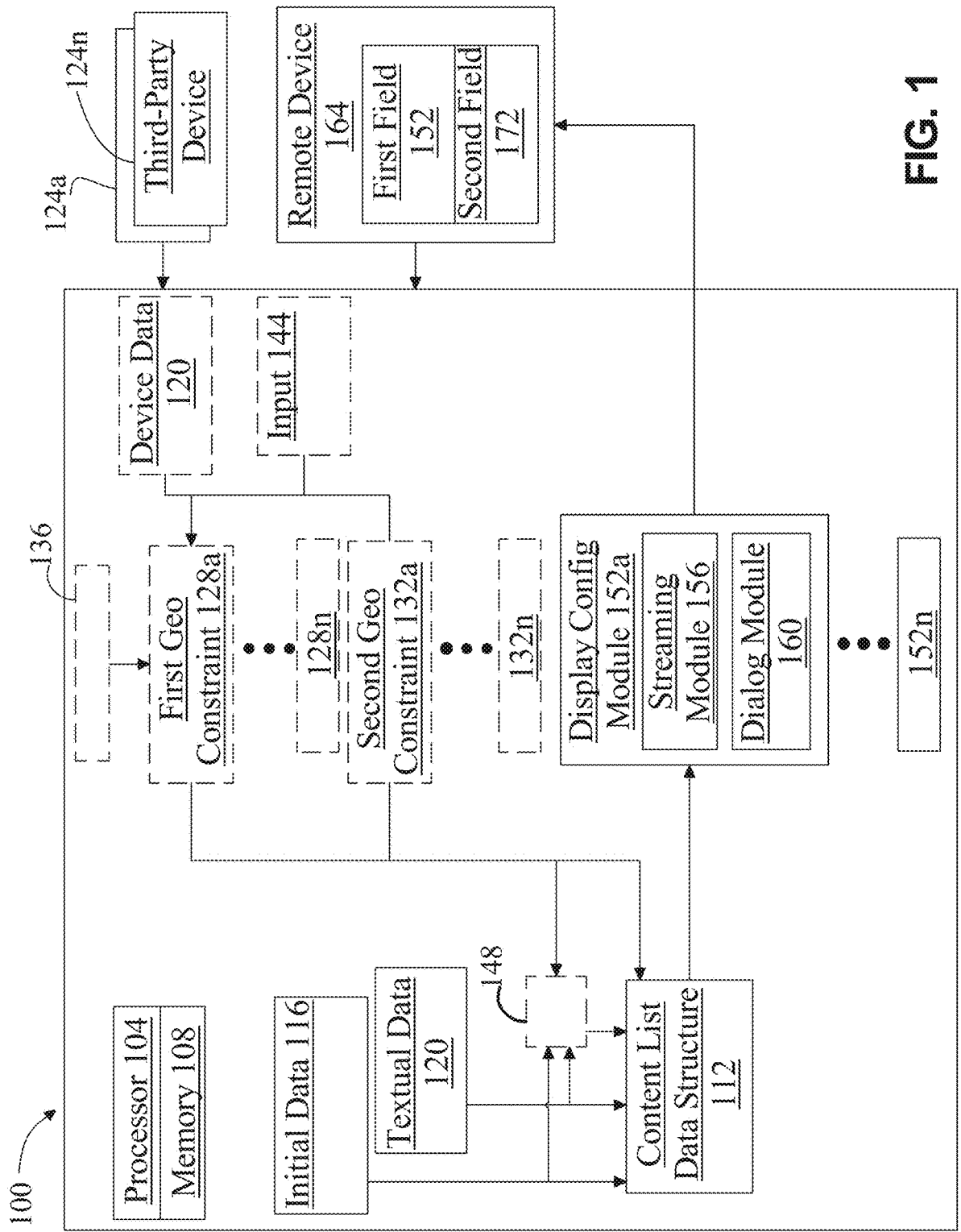
FIG. 1 is a block diagram illustrating an exemplary embodiment of an apparatus for generating a graphical interface with a dual-layer component.

Referring now to FIG. 1, an exemplary embodiment of an apparatus 100 for a graphical interface with a dual-layer component is illustrated. In some embodiments, dual-layer component may include a dual-layer server component. Apparatus 100 may include, without limitation, a computing device. Apparatus 100 includes a processor 104 communicatively connected to a memory 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, apparatus 100 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Configuration of at least a processor 104 using instructions in memory may be used interchangeably in this disclosure with configuration of apparatus 100 and/or processor 104.

Still referring to FIG. 1, apparatus 100 is configured to generate a content list data structure 112 based on at least an element of initial data 116. Initial data 116 may include any data available in memory of apparatus 100 prior to generation of content list data structure 112, including without limitation one or more user commands and/or instructions entered for instance via user interface and/or graphical user interface elements as described in further detail below. Initial data 116 may include, without limitation, data that is stored in memory of apparatus 100 as a result of previous iterations of any method and/or method steps as described in this disclosure, such as previous inputs, previous versions of content list data structure 112, previous neural networks or machine-learning models and/or coefficients, biases, or other parameters thereof, or the like. Initial data 116 may include previously determined geographical constraints as described in further detail below. As far as contents of initial data 116 are concerned, such contents or values may include user information, user account information, information describing one or more institutions, companies, hospitals, behavior health units, rehabilitation units, or other units of hospitals, medical facilities and/or units or portions thereof, geographical or juridical regions such as municipalities, counties, states, nations, regional governmental collectives such as the European Union, one or more regulations, laws, case decisions, or compliance guidelines, one or more industry, institutional, or other standards and/or "best practices," data describing previous activities, such as without limitation a start-up or initial set up of one or more institutions, companies, hospitals, behavior health units, rehabilitation units, or other units of hospitals, medical facilities and/or units or portions thereof, including without limitation data describing degree of deviation from one or more regulatory, commercial, care, or other goals, data describing degree of success in achieving one or more such goals, or the like. Persons skilled in the art, upon reviewing the entirety of this disclosure, will be aware of various alternative or additional examples of initial data 116 that may be used by apparatus 100 to generate a content list data structure 112.

With continued reference to FIG. 1, a "content list data structure 112" is a data structure enumerating and/or listing a plurality of elements of data to be conveyed using user interface elements and/or modules as described in further detail below. In some embodiments, content list data structure 112 may include a plurality of steps and/or tasks to be performed by a downstream device, system, and/or end-user; such plurality of steps may include and/or be interpreted as a "checklist" of actions, processes, routines, functions, or the like to be performed by such downstream device, system, and/or end-user. For instance, where actions, processes, routines, functions or the like are to be performed by an end-user and/or organization in a healthcare field, such as a hospital or unit thereof, data stored in content list data structure 112 may be representable as a checklist of actions to be performed by such end-user and/or organization. As an example, and for illustrative purposes only, content list data structure 112 may be and/or include a data structure representing a "startup plan," where a startup plan is a checklist-style plan that provides instructions on starting a new unit, such as a behavioral health unit or rehab unit, at a hospital, including steps to be taken in furnishing rooms, obtaining, installing, and/or testing equipment, employment decisions and processes, safety configurations and protocols, security devices, facilities, and/or protocols, accessibility requirements, cost considerations, or the like. Further examples of startup plans and/or other data and/or data structure information that may be used in and/or with content list data structure 112 may be found, without limitation, in U.S. patent application Ser. No. 18/958,334, filed on Nov. 25, 2024, and entitled "APPARATUS AND METHOD FOR GENERATING AN INTERACTIVE GRAPHICAL USER INTERFACE" the entirety of which is incorporate herein by reference, and/or in U.S. patent application Ser. No. 18/957,617, filed on Nov. 22, 2024, and entitled "APPARATUS AND METHODS FOR GENERATING STRUCTURED DATA OUTPUTS" the entirety of which is incorporate herein by reference.

With further reference to FIG. 1, apparatus 100 may be configured to generate content list data structure 112 by transmitting a query to at least a third-party device 124*a-n* based on the initial data 116, receiving textual data 120 from the at least a third-party device 124*a-n*, and generating the content list data structure 112 using the textual data 120, where textual data 120 may include any data that can be represented using character and/or string datatypes, including writing system characters from any writing system, punctuation, numerals, special characters, and the like, or any combination thereof. For instance, and without limitation, apparatus 100 may use a program such as a "web crawler," "spider," or "web scraper" to identify uniform resource locators (URLs) of web pages associated with and/or hosted on third-party devices 124*a-n* and/or webservices, transmit hypertext transfer protocol (HTTP), HTTP-secure (HTTPS), or other Internet communication protocol requests to locations specified by such URLs, receive output in response, and parse text, images, and/or other data and/or metadata that may be received in response to such a request; parsed data may be saved in variables or other data structures for additional processing or analysis. Query to third-party device 124*a-n* may be generated, transmitted, or assisted using a web search index. A "web search index," as defined in this disclosure is a data structure that stores URLs of web pages together with one or more associated data that may be used to retrieve URLs by querying the web search index; associated data may include keywords identified in pages associated with URLs by programs such as web crawlers and/or spiders. A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. Third-party devices 124*a-n* may provide any kind of data suitable for use as initial data 116, including without limitation regulatory, industry standard, or "best practice" information.

In some embodiments, and still referring to FIG. 1, at least a third-party device 124*a-n* may include a plurality of third-party devices 124*a-n*, and apparatus 100 may select a subset that is less than the total of the plurality of third-party devices 124*a-n* based upon one or more criteria. Apparatus 100 may generate content list using textual data 120 received from the selected third-party device 124*a-n*. One or more criteria may include, without limitation, identity of one or more institutions, entities, governmental bodies, or the like operating third-party devices 124*a-n*; for example, a URL associated with third-party device 124*a-n* may be stored in memory and/or a database as associated with a body promulgating industry standards, a government and/or governmental department or institution that promulgates regulations, an official publisher of statutes and/or cases, a website of a person or corporate entity with information relevant to initial data 116, or the like.

With continued reference to FIG. 1, apparatus 100 may be configured to determine a device identifier of at least one of remote device 164 and/or at least a third-party device 124*a-n*; device identifier may be used to identify a third-party device 124*a-n*, look up information to be associated with a criterion for selection of third-party device 124*a-n* or rejection thereof, used to look up geographical constraints as described in further detail below, or the like. A "device identifier," as used in this disclosure, is any element of data that identifies a remote device 164 and/or a user thereof, including without limitation a MAC address, a serial number, a globally unique identifier (GUID) a universally unique identifier (UUID), a username, one or more user login credentials such as passwords, tokens or the like, and/or any other element suitable to identify a device and/or user thereof as described herein.

Still referring to FIG. 1, determining a device identifier may include identifying device fingerprint data of a device such as remote device 164 and/or at least a third-party device 124*a-n* and determining the device identifier from the device fingerprint data. "Device fingerprint data," as used in this disclosure, is data used to determine a probable identity of a device as a function of at least a field parameter a communication from the device. At least a field parameter may be any specific value set by a computing device and/or user thereof for any field regulating exchange of data according to protocols for electronic communication. As a non-limiting example, at least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," "transaction_id," and the like. Determining the identity of a computing device may include fingerprinting the computing device as a function of at least a machine operation parameter described a communication received from the computing device. At least a machine operation parameter, as used herein, may include a parameter describing one or more metrics or parameters of performance for a device and/or incorporated or attached components; at least a machine operation parameter may include, without limitation, clock speed, monitor refresh rate, hardware or software versions of, for instance, components of a computing device, a browser running on a computing device, or the like, or any other parameters of machine control or action available in at least a communication. In an embodiment, a plurality of such values may be assembled to identify a computing device and distinguish it from other devices, and/or to look up computing device to determine a device identifier or other data concerning the device.

As a further non-limiting example, apparatus 100 may determine a first geographical constraint 128*a-n* of the remote device 164, and use such geographical constraint to select third-party device 124*a-n*. A "geographical constraint," as used in this disclosure, is a geographical region and/or location associated with a computing device, including without limitation a location and/or region containing the computing device and/or a location and/or region containing an entity and/or user operating and/or owning the computing device. For instance, and without limitation, a server or other computing device operating the website of a state or city may have a geographical constraint associated with the state or city. A geographical constraint may be defined in terms of geometry, such as a region defined by a radius around a point, a distance from a border, a square or other geometric form containing a given number of acres, square miles, square kilometers, or other units of area containing and/or centered on a given location, metes and bounds of real property as indicated by a deed or other document, boundaries and/or borders of a juridical region such as a municipality, state, province, department, semi-autonomous region, nation, collection of nations, or the like. Geographical constraint may include a geographically defined region such as an area between two bodies of water such as two rivers, an area bounded on one side or another by a coast, a continent, or the like. A given computing device, including without limitation remote device 164 and/or at least a third party device 124*a-n*, may have multiple geographical constraints; for instance, a device could have a first constraint indicating location within a particular building or suite, a second constraint indicating location within a city, a third constraint indicating location within a state, a fourth constraint indicating location within a nation, and so forth. Multiple geographical constraints of a device may be overlapping, nested, or disjoint.

Still referring to FIG. 1, apparatus 100 may determine one or more geographical constraints of remote device 164 and/or at least a third-party device 124*a-n* using internet protocol (IP) geolocation. IP geolocation, as used in this disclosure, is a mapping of IP addresses and/or media access control (MAC) addresses to particular and/or approximate geographical locations; computing device may look up the particular and/or approximate geographical location of first remote device 164 108 upon receiving an IP and/or MAC address of a computing device and/or of a modem, server, wireless communication hub, and/or other device by means of which the computing device is transmitting data. Alternatively or additionally, apparatus 100 may determine an approximate location of a computing device by measuring network communication latency; for instance, if responses from remote device 164 are received within a threshold amount of time, a computing device may be determined to be within some maximal radius from apparatus 100, and/or from a modem, server, wireless communication hub, and/or other device by means of which the computing device is transmitting data. Apparatus 100 may alternatively or additionally store and/or look up geographical locations associated with device fingerprint data, including fingerprint of a computing device, intermediary devices, or the like, where "intermediary devices" are defined as any devices by means of which a computing device is transmitting data, such as a modem, server, wireless communication hub, and/or other device by means of which the computing device is transmitting data. Intermediary devices may alternatively or additionally provide their geographic data, which may be used in turn to estimate a location of a computing device; for instance, network communication latency may be used to estimate a distance from intermediary device to the computing device, and/or intermediary device may communicate with the computing device using local types of transmission, for instance if intermediary device is a wi-fi hub, cell tower, or the like.

Still referring to FIG. 1, in some embodiments, determining first geographical constraint 128*a-n* may include using a trained geographical constraint neural network 136 and/or machine-learning model. For instance, apparatus 100 may be configured to train a geographical constraint neural network 136 using training data correlating device data 140 examples to geographical constraint data. Data examples may be generated in earlier iterations of methods and/or method steps as described in this disclosure; for instance, and without limitation, one or more users of apparatus 100 and/or client devices communicatively connected thereto and/or configured thereby as described in further detail below may provide implicit and/or explicit feedback. Explicit feedback may be provided, without limitation, by a user entering an indication via a user interface that a given determination by geographical constraint neural network 136 is incorrect, by a user identifying a correct answer by textual entry, selection of one or more options represented by event handler graphics triggering event handlers as described in further detail below, or the like. Implicit feedback may include, without limitation, entries by a user indicating that downstream determinations and/or indications are incorrect, such as determinations made using geographical constraint data, including checklist elements or other statements pertaining to regulations in an inapplicable jurisdiction, to institutions that differ from an institution for which a startup plan or the like is being implemented, or the like. Alternatively or additionally, training data may be curated by a user and/or device that selects and/or generates training examples using known correct data, which examples may be used for initial training and/or retraining. Apparatus 100 may alternatively or additionally receive a trained geographical constraint neural network 136 and/or machine-learning model from another device and instantiate and/or deploy the received neural network and/or model; retraining based on feedback or updated training data may be performed by apparatus 100 and/or another device, followed by redeployment or re-instantiation.

Further referring to FIG. 1, apparatus 100 may be configured to detect device data 140 of remote device 164; device data 140 may include any data of or about remote device 164, including without limitation user-entered data, device fingerprint data, or any other data that may be used to determine a geographical constraint as described above. Apparatus 100 may be configured to determine first geographical constraint 128*a-n* using device data 140 and geographical constraint neural network 136 and/or machine-learning model. Apparatus 100 may determine a second geographical constraint 132*a-n* of a selected third-party device 124*a-n* of the plurality of third-party device 124*a-n*, using any process described above, including without limitation collection IP geolocation data and/or other device data 140 of one or more third-party devices 124*a-n* and/or use of a geographical constraint neural network 136.

Still referring to FIG. 1, apparatus 100 may select a third-party device 124*a-n* of the plurality of third-party devices 124*a-n* based on a comparison of data, such as without limitation device data 140 and/or geographical constraints, of the third-party device 124*a-n* to comparable data and/or data representing similar category or categories of data, of remote device 164. This may, for instance, aid in the accuracy and/or reliability of one or more downstream processes; for instance, relevance or usefulness of data received from a third-party device 124*a-n* may depend on a degree to which third-party device 124*a-n* shares a geographical constraint, a set of geographical constraints, and/or has some level of similarity of geographical constraints and/or device data 140 with remote device 164. As a non-limiting and illustrative example, regulatory data, such as data describing regulations, laws, or the like, data describing best practices and/or standards, data describing customs, or the like may only be relevant when a remote device 164 and/or an entity or user associated therewith is located in a geographical area or jurisdiction where such regulatory, best practices, industry standard, or customary data is applicable. As a further non-limiting example, units of measurement, currency, or other data may be useful in one geographical location and/or misleading or mistaken in another; furthermore, geographical constraints may be necessary context for understanding whether a number such as a measurement, which may be presented without units, is to be interpreted as metric versus imperial, and/or one currency over another, or the like. Restriction of sources to particular geographical constraints may thus improve machine-learning models and/or neural networks trained therewith, graphical user interfaces that determine fields, programs, or other elements to be incorporated into displays, based on such data, and other downstream processes.

Continuing to refer to FIG. 1, in some embodiments selection may be performed by determining that one or more geographical constraints of a third-party device 124*a-n* matches one or more geographical constraints of remote device 164. For instance, remote device 164 may have the same geographical constraint as a third-party device 124*a-n*, or may have one or more geographical constraints in common; in this case, for instance, regulations or other geographically specific data reported by third-party device 124*a-n* may be useful and/or relevant for a user of remote device 164. Matching may be performed more indirectly; for instance, multiple factors including device data 140, device identity, geographical data, or other data may be compared to determine a degree of relevance and/or usefulness of data obtained from third-party device 124*a-n*. Multiple factors may be compared using a decision tree, which may be hierarchically arranged such that more important factors are considered first; for instance, if sharing a jurisdiction is a prerequisite to use of information from third-party device 124*a-n*, a node of a decision tree checking for shared jurisdiction may be traversed prior to a node pertaining to a less crucial detail. Alternatively or additionally, multiple factors may be compared by generating embeddings comparing them, for instance and without limitation by feeding them into an encoder or encoder-only LLM such as a BERT as described in further detail below. Output embeddings may be compared to each other, for instance and without limitation using cosine similarity or other geometric measures of similarity, where more similar embeddings, or embeddings with similarity beyond a preconfigured threshold, may lead to selection of third-party device 124*a-n*. Multiple methods of matching and/or comparison may alternatively or additionally be used; for instance, a decision tree or one or more control logic or if-then type statements may be used to ensure match on necessary factors, such as jurisdiction, while matching using embeddings or other more flexible comparison techniques may be used for other factors.

In some embodiments, and with further reference to FIG. 1, apparatus 100 may generate content list data structure 112 by determining a plurality of overlapping geographical constraints of the remote device 164 and generating the content list data structure 112 using the plurality of overlapping geographical constraints. For instance, and without limitation, where remote device 164 has a first geographic constraint including a municipality and a second jurisdictional constraint including a state, content list data structure 112 may be generated using both data from a third-party device 124*a-n* matching municipality and a third-party device 124*a-n* matching the state; as a non-limiting example, one third-party device 124*a-n* may contain regulatory information from municipal regulations of the city, while another may list regulatory information of state laws or regulations. Alternatively or additionally, each or all overlapping geographical constraints may be fed into a neural network or machine-learning model to match remote device 164 to one or more third-party devices 124*a-n* and/or to generate content list data structure 112.

With continued reference to FIG. 1, apparatus 100 may generate content list data structure 112 by receiving an input 144 from the remote device 164 and generating the content list data structure 112 using the input; input 144 may be received in any suitable manner, including without limitation being received via any field, including text entry fields, event handlers, selections from premade lists or the like. Content list data structure 112 may be generated using any combination of the above-described data, including device data 140, initial data 116, input data or the like. Data received in textual form may be processed, organized, matched, or used in any manner described in this disclosure or any disclosure incorporated herein by reference.

Still referring to FIG. 1, apparatus 100 may generate content list data structure 112 by generating the content list data structure using a trained content list data structure neural network 148 and/or machine-learning model. Apparatus 100 may train content list data structure neural network 148 and/or machine-learning model using training data that may correlate inputs to content list data structure neural network 148 and/or machine-learning model to content list data structure 112 examples. Data examples may be generated in earlier iterations of methods and/or method steps as described in this disclosure; for instance, and without limitation, one or more users of apparatus 100 and/or client devices communicatively connected thereto and/or configured thereby as described in further detail below may provide implicit and/or explicit feedback. Explicit feedback may be provided, without limitation, by a user entering an indication via a user interface that a given content list data structure 112 generated, or portion or entry thereof, by content list data structure neural network 148 and/or machine-learning model is incorrect, by a user identifying a correct answer by textual entry, selection of one or more options represented by event handler graphics triggering event handlers as described in further detail below, or the like. Implicit feedback may include, without limitation, entries by a user indicating that downstream determinations and/or indications are incorrect, such as determinations made and/or modules selected, identified, or generated using content list data structure 112, are incorrectly chosen and/or generated. Training data may be filtered by one or more attributes or signifiers; for instance, training data may be filtered and/or selected for particular geographical constraints, including geographical constraints of remote device 164, which may be accomplished, without limitation, using a decision tree as described above. Training data may be classified according to one or more attributes or signifiers; for instance, training data may be classified based on input data, device, data, geographical constraints or the like, including such data of remote device 164, using, without limitation, encoders and/or other classifiers as described in this disclosure. Training data may include data received from third-party devices 124a-n as described above. Alternatively or additionally, training data may be curated by a user and/or device that selects and/or generates training examples using known correct data, which examples may be used for initial training and/or retraining. Apparatus 100 may alternatively or additionally receive a trained content list data structure neural network 148 and/or machine-learning model from another device and instantiate and/or deploy the received neural network and/or model; retraining based on feedback or updated training data may be performed by apparatus 100 and/or another device, followed by redeployment or re-instantiation. In some embodiments, data may be fed into one or more initial stages such as encoders as described in further detail below, each of which may convert a distinct data type or collection of data types into an embedding or other representation of the input data; such embeddings or encodings may then be input to content list data structure neural network 148 and/or machine-learning model.

Continuing to refer to FIG. 1, apparatus 100 may identify a plurality of display configuration modules 152a-n based on the content list data structure 112. A "display configuration module 152a-n," as used in this disclosure, is hardware or software module, program, routine, function, subroutine, or set of instructions, including instructions within another module, program, routine, function, and/or subroutine, that configures a remote device 164 to display one or more elements of data; display may occur within dedicated programs therefor, such as without limitation web browsers, native applications or "apps," or the like. A display configuration module 152a-n may include and/or be included in or invoked by a server-side program element such as a common gate interface, .asp, .jsp, and/or .php file, which may run on apparatus 100 or a server or computing device associated therewith and output data, program instructions, and/or links to or feeds from sources of data and/or program instructions to remote device 164. A display configuration module 152a-n may include a server-side program and/or a client-side program to be loaded and executed on a remote device 164. Non-limiting examples of such programs may include a streaming module 156, defined as a module that is, includes, or causes execution of audio and/or video streaming programs and/or programs that play stored audio and/or video content, which may encode, transmit, and/or decode video and/or audio streams, files, or the like for output or display on remote device 164; note that "display" of an audio file may include audio output thereof with or without visual indica such as video, animation, widgets, buttons, or the like. A display configuration module 152a-n may include one or more interactive programs, including without limitation a dialog module 160. A "dialog module 160," as used in this disclosure, is a module that is, includes, or causes to execute a program that displays and inputs a series of textual communications with a user, which may include without limitation displayed, typed, audio input, and/or audio output text. Dialog module 160 may include a chatbot as described in further detail below. In some embodiments, using a content list data structure 112 to generate display configuration modules 152a-n addresses a problem commonly encountered by graphical user interfaces: information directing display may have widely varying information density or comprehensibility, such that in some instances one form of GUI representation may be suitable, while in others it may be entirely unsuitable. A two-step process in which the data to be conveyed is first determined, and then used to determine a form in which the GUI is to be generated, including which elements to use and the types of elements to be used, permits a more efficient and intelligible display at the end.

Continuing to refer to FIG. 1, as a non-limiting example for purposes of illustration, apparatus 100 may assign and administer one or more course modules as a function of content list data structure 112, which course modules may include and/or be provided using a plurality of display configuration modules 152a-n selected as described above. Such courses may include, for example, courses on regulatory aspects impacting a new hospital, rehab, or other unit, administrative instruction courses, or the like. Course modules and/or display and/or GUI elements thereof may be implemented, without limitation, as described in patent application Ser. No. 18/957,680, filed on Nov. 23, 2024, and entitled "AN APPARATUS COMPRISING A GRAPHICAL USER INTERFACE (GUI) FOR DISPLAYING AND MODIFYING DATA ELEMENTS BASED ON USER INPUT AND LOCATION DATA" the entirety of which is incorporated herein by reference.

In some embodiments, and with further reference to FIG. 1, apparatus 100 may be configured to identify plurality of display configuration modules 152a-n by using a display configuration neural network and/or machine-learning model. Apparatus 100 may train display configuration neural network and/or machine-learning model. For instance, apparatus 100 may be configured to train a display configuration neural network using training data correlating content list data structure 112 examples to exemplary selections and/or identifications of display configuration modules 152a-n. Data examples may be generated in earlier iterations of methods and/or method steps as described in this disclosure; for instance, and without limitation, one or more users of apparatus 100 and/or client devices communicatively connected thereto and/or configured thereby as described in further detail below may provide implicit and/or explicit feedback. Explicit feedback may be provided, without limitation, by a user entering an indication via a user interface that a given identification and/or selection of display configuration modules 152a-n by display configuration neural network and/or machine-learning model is incorrect, by a user identifying a correct answer by textual entry, selection of one or more options represented by event handler graphics triggering event handlers as described in further detail below, or the like. Implicit feedback may include, without limitation, entries by a user indicating that downstream actions by apparatus 100 are incorrect, such as outputs of content, and/or sections of types of content to be output, as described in further detail below, which the user interprets as incorrect. Alternatively or additionally, training data may be curated by a user and/or device that selects and/or generates training examples using known correct data, which examples may be used for initial training and/or retraining. Apparatus 100 may alternatively or additionally receive a trained display configuration neural network and/or machine-learning model from another device and instantiate and/or deploy the received neural network and/or model; retraining based on feedback or updated training data may be performed by apparatus 100 and/or another device, followed by redeployment or re-instantiation.

In some embodiments, and continuing to refer to FIG. 1, apparatus 100 may be configured to pass one or more display configuration modules 152a-n and/or content list data structure 112 through processing stages to convert the one or more display configuration modules 152a-n and/or content list data structure 112 into inputs to display configuration neural network and/or machine-learning model, or to be compared directly using geometric similarity such as cosine similarity or other process or techniques for matching embeddings to one another. For instance, and without limitation, streaming data such as audio streaming data may be input to an encoder neural network such as a BERT as textual representation of words extracted from audio using speech-to-text processes and/or modules, textual scripts or metadata, or the like. Program source code, document object model elements, or the like may also be processed and/or encoded as textual data 120. Content list data structure 112 may similarly be processed as textual data 120 in some embodiments.

Still referring to FIG. 1, apparatus 100 may be configured to input video streaming content to an encoder such as a BERT using textual data 120 as with audio content above and/or textual data 120 describing video content; alternatively or additionally, one or more encoders may take images or series of images, as inputs, which images may include, without limitation, reference frames of videos. As used in this disclosure, a "video" is an item of media, that includes a recording of moving visual images made digitally or on videotape. A video may be comprised of a plurality of scenes. As used in the current disclosure, a "scene" is a small segment of video. A scene may also represent a group of pictures. A Video may include an image component, audio component, and related to a subject. In some cases, video may include a digital video, which may be communicated by way of digital signals, for example between computing devices which are communicatively connected with at least a network. Digital video may be compressed in order to optimize speed and/or cost of transmission of video. Videos may be compressed according to a video compression coding format (i.e., codec). Exemplary video compression codecs include without limitation H.26x codecs, MPEG formats, VVC, SVT-AV1, and the like. In some cases, compression of a video may be lossy, in which some information may be lost during compression. Alternatively or additionally, in some cases, compression of a video may be substantially lossless, where substantially no information is lost during compression.

Still referring to FIG. 1, a computing device may be configured to identify a series of frames of video. The series of frames may include a group of pictures having some degree of internal similarity, such as a group of pictures representing a scene. In some embodiments, comparing a series of frames may include video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression may be either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Data compression may be subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

Still referring to FIG. 1, inter-frame coding may function by comparing each frame in the video with another frame, which may include a previous frame. Individual frames of a video sequence may be compared between frames, and a video compression codec may send only the differences from a reference frame for frames other than the reference frame. If a frame contains areas where nothing has moved, a system may issue a short command that copies that part of a reference frame into the instant frame. If sections of a frame move in manner describable through vector mathematics and/or affine transformations, or differences in color, brightness, tone, or the like, an encoder may emit a command that directs a decoder to shift, rotate, lighten, or darken a relevant portion. An encoder may also transmit a residual signal which describes remaining more subtle differences from reference frame, for instance by subtracting a predicted frame generated through vector motion commands from the reference frame pixel by pixel. Using entropy coding, these residual signals may have a more compact representation than a full signal. In areas of video with more motion, compression may encode more data to keep up with a larger number of pixels that are changing. As used in this disclosure, reference frames are frames of a compressed video (a complete picture) that are used to define future frames. As such, they are only used in inter-frame compression techniques. Some modern video encoding standards, such as H.264/AVC, allow the use of multiple reference frames. This may allow a video encoder to choose among more than one previously decoded frame on which to base each macroblock in another frame.

With continued reference to FIG. 1, two frame types used in inter-fame coding may include P-frames and B-frames. A P-frame (Predicted picture) may hold only changes in an image from a reference frame. For example, in a scene where a car moves across a stationary background, only the car's movements may need to be encoded; an encoder does not need to store the unchanging background pixels in the P-frame, thus saving space. A B-frame (Bidirectional predicted picture) may save even more space by using differences between a current frame and both preceding and following frames to specify its content. An inter coded frame may be divided into blocks known as macroblocks. A macroblock may include a processing unit in image and video compression formats based on linear block transforms, such as without limitation a discrete cosine transform (DCT). A macroblock may consist of 16×16 samples, for instance as measured in pixels, and may be further subdivided into transform blocks, and may be further subdivided into prediction blocks. Formats which are based on macroblocks may include JPEG, where they are called MCU blocks, H.261, MPEG-1 Part 2, H.262/MPEG-2 Part 2, H.263, MPEG-4 Part 2, and H.264/MPEG-4 AVC. After an inter coded frame is divided into macroblocks, instead of and/or in addition to directly encoding raw pixel values for each block, an encoder may identify a block similar to the one it is encoding on another frame, referred to as a reference frame. This process may be performed by a block matching algorithm. If an encoder succeeds on its search for a reference frame, a block may be encoded by a vector, known as motion vector, which points to a position of a matching block at the reference frame. A process of motion vector determination may be referred to as motion estimation. Residual values, based on differences between estimated blocks and blocks they are meant to estimate, may be referred to as a prediction error and may be transformed and sent to a decoder.

Still referring to FIG. 1, using a motion vector pointing to a matched block and/or a prediction error a decoder may reconstruct raw pixels of an encoded block without requiring transmission of the full set of pixels. For example, video may be compressed using a P-frame algorithm and broken down into macroblocks. Individual still images taken from video may then be compared against a reference frame taken from another video or augmented video. A P-frame from video may only hold the changes in image from target video. For example, if both video include a similar image, frame, or other element of a video and/or group of pictures, then what may be encoded and stored may include subtle changes such as an additional character dialogue or character appearances compared to the video without the dialogue. Exemplary video compression codecs may include without limitation H.26x codecs, MPEG formats, VVC, SVT-AV1, and the like. In some cases, compression may be lossy, in which some information may be lost during compression. Alternatively, or additionally, in some cases, compression may be substantially lossless, where substantially no information is lost during compression. In some cases, image component may include a plurality of temporally sequential frames. In some cases, each frame may be encoded (e.g., bitmap or vector-based encoding). Each frame may be configured to be displayed by way of a display. In some embodiments, a video may be classified, encoded to embeddings, or the like using reference frames from the video, which may be fed into encoders, classifiers, or the like that are configured to accept images as inputs.

In some embodiments, and with continued reference to FIG. 1, embeddings and/or other representations of data, modules, and/or content list data structure 112 may be used as inputs to display configuration neural network, and examples thereof and/or examples of encodings or embeddings thereof may similarly be used as inputs and/or outputs correlated together in training data. Alternatively or additionally, embeddings or other encodings may be compared using geometric or other comparisons as described above.

Continuing to refer to FIG. 1, apparatus 100 is configured to configure a remote device 164 to generate a plurality of display fields. Each display field produces an output from an interface-level component of the plurality of interface-level components. Plurality of display fields includes a first display field 168 configured to display an output of the streaming module 156. Plurality of display fields includes a second display field 172 configured to display an output of the dialog module 160 and receive and input to the dialog module 160. A "display field," as used in this disclosure, is a frame, area, layer, and/or other visual division of a graphical user interface dedicated to display and or output of content generated and/or provided using a display configuration module 152a-n. A display field may include and/or interact with one or more display elements. A "display element," as used in this disclosure, is an image that a program and/or data structure may cause to be displayed on a display of remote device 164. Display elements may include, without limitation, windows, pop-up boxes, web browser pages, display layers, and/or any other display element that may occur to a person skilled in the art upon reviewing the entirety of this disclosure. A graphical view may include at least a display element and/or field generated by one or more display configuration modules 152a-n. Display elements and/or fields may include one or more selectable event graphics. A "selectable event graphic," as used in this disclosure, is a graphical element that upon selection using a cursor or other locator as manipulated using a locator device such as a mouse, touchscreen, track pad, joystick, or the like will trigger an action to be performed on remote device 164. As a non-limiting example, a selectable event graphic may include a redirection link, defined as a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of selectable event graphic. Redirection may be performed using any event handler, including without limitation event handlers detecting the click of a mouse or other locator, access of redirection link using a touchscreen, the selection of any key, mouseover events, or the like. Event handlers may also trigger execution of one or more program instructions, display or output of audio or video content, one or more chatbots and/or chatbot entries, and/or any other input, processing, and/or output steps as described in this disclosure.

In some embodiments, apparatus 100 may be configured to generate an output of the content list data structure 112. Apparatus 100 may be configured to configure the remote device 164 to display the generated output. Output may include, without limitation, a list of textual or other visual representations of elements of content list data structure 112. For instance, such a list may be displayed and/or used as a "checklist" for a user to follow while, for instance, setting up a new rehabilitation unit or other new unit at a hospital, or the like. Alternatively or additionally, one or more event handler graphic and/or event handlers may be displayed; such event handlers or event handler graphics may be displayed adjacent to and/or in combination with checklist entries, such that selection of such an entry or a graphic adjacent thereto may trigger one or more processes. One or more processes may include initiation of programs using display configuration modules 152a-n and/or any other process or process steps described in this disclosure. For instance, selection of a checklist item and/or event handler graphic may trigger initiation of a dialog module 160, causing administration of a quiz, chatbot session, or the like; alternatively or additionally, selection may cause display of video, audio or other content to instruct or train a user in one or more elements of information, such as without limitation regulatory information Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Figure 2:
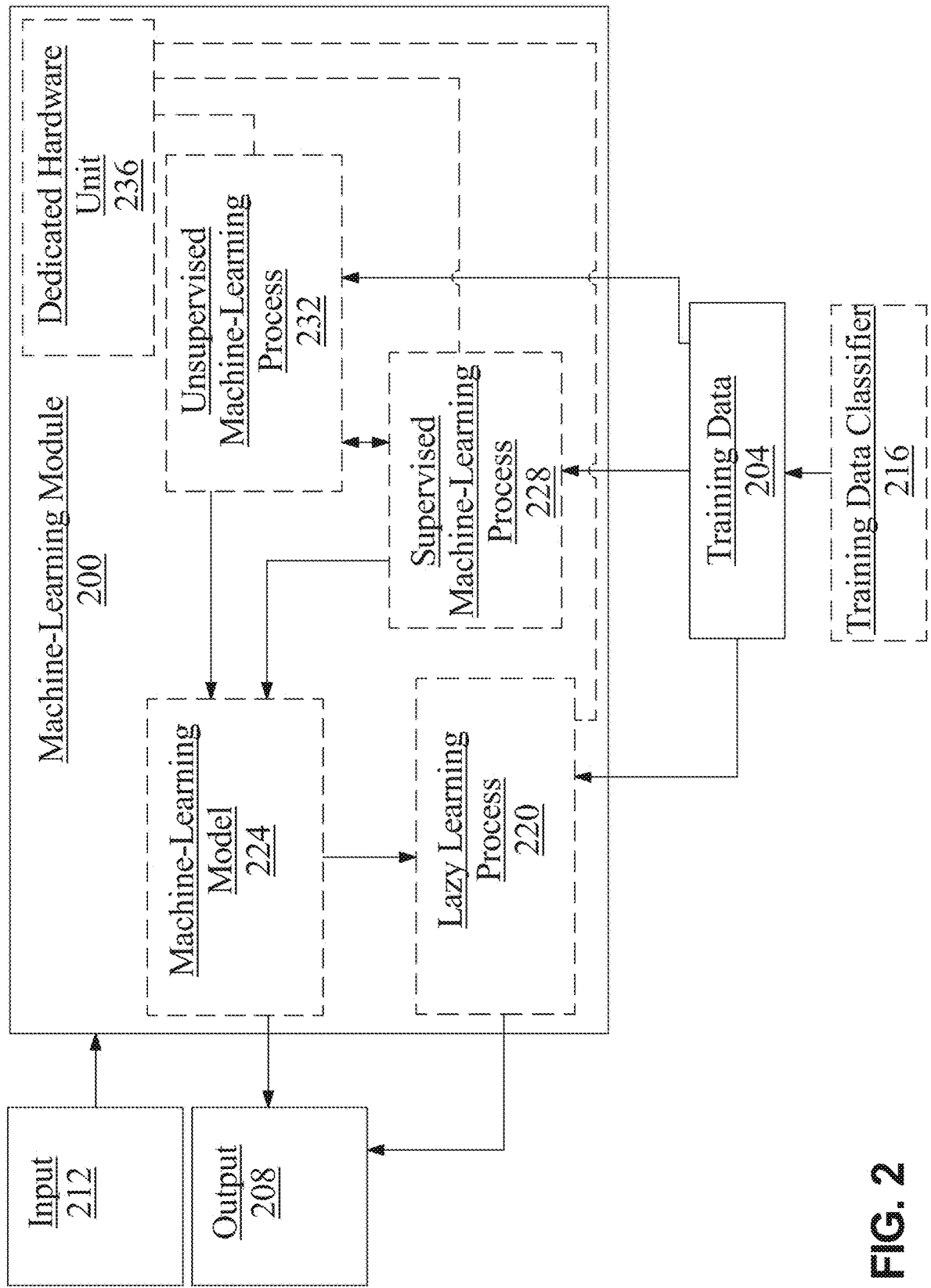
FIG. 2 is a block diagram illustrating an exemplary embodiment of a machine-learning module.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data 120, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus 100, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus 100, and/or method described in this disclosure; such examples may be modified and/or labeled according to user feedback or other processes to indicate desired results, and/or may have actual or measured results from a process being modeled and/or predicted by system, module, machine-learning model or algorithm, apparatus 100, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus 100, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Still referring to FIG. 2, machine learning process may include a generative machine learning process. As used in this disclosure, a "generative machine learning process" is a process that automatedly, using a prompt (i.e., input), generates an output consistent with training data; this is in contrast to a non-machine learning software program where outputs are determined in advance by a user and written in a programming language. In some embodiments, generative machine-learning processes may determine patterns and structures from training data and use these patterns and structures to synthesize new data with similar characteristics, as a function of an input. As a non-limiting example, generative machine-learning process may determine patterns and structures from training data of language processing models or any machine-learning models and/or neural networks described in the entirety of this disclosure and may use these patterns to synthesize new data.

With continued reference to FIG. 2 generative machine learning processes may synthesize data of different types or domains, including without limitation text, code, images, molecules, audio (e.g., music), video, and robot actions (e.g., electromechanical system actions). Exemplary generative machine learning systems trained on words or word tokens, operant in text domain, include GPT-3, LaMDA, LLaMA, BLOOM, GPT-4, and the like. Exemplary machine learning processes trained on programming language text (i.e., code) include without limitation OpenAI Codex. Exemplary machine learning processes trained on sets of images (for instance with text captions) include Imagen, DALL-E, Midjourney, Adobe Firefly, Stable Diffusion, and the like; image generative machine learning processes, in some cases, may be trained for text-to-image generation and/or neural style transfer. Exemplary generative machine learning processes trained on molecular data include, without limitation, AlphaFold, which may be used for protein structure prediction and drug discovery. Generative machine learning processes trained on audio training data include MusicLM which may be trained on audio waveforms of music correlated with text annotations; music generative machine learning processes, in some cases, may generate new musical samples based on text descriptions. Exemplary generative machine learning processes trained on video include without limitation RunwayML and Make-A-Video by Meta Platforms. Finally, exemplary generative machine learning processes trained using robotic action data include without limitation UniPi from Google Research.

With continued reference to FIG. 2, in some cases a generative machine learning process may include a generative adversarial network (GAN). As used in this disclosure, a "generative adversarial network" is a machine learning process that includes at least two adverse networks configured to synthesize data according to prescribed rules (e.g., rules of a game). In some cases, a generative adversarial network may include a generative and a discriminative network, where the generative network generates candidate data and the discriminative network evaluates the candidate data. An exemplary GAN may be described according to a following game: Each probability space $(\Omega, \mu_{ref})$ defines a GAN game. There are two adverse networks: a generator network and a discriminator network. Generator network strategy set is $P(\Omega)$, the set of all probability measures $\mu_G$ on $\Omega$. Discriminator network strategy set is the set of Markov kernels $\mu_D: \Omega \rightarrow P[0,1]$, where $P[0,1]$ is set of probability measures on $[0,1]$. GAN game may be a zero-sum game, with objective function:

$$L(\mu_G, \mu_D) := \mathbb{E}_{x \sim \mu_{ref}, y \sim \mu_D(x)}[\ln y] + \mathbb{E}_{x \sim \mu_G, y \sim \mu_D(x)}[\ln(1 - y)].$$

Generally, generator network may aim to minimize objective, and discriminator network may aim to maximize the objective. Specifically, generator network seeks to approach $\mu_G \approx \mu_{ref}$, said another way, generator network produces candidate data that matches its own output distribution as closely as possible to a reference distribution (provided with training data). Discriminator network outputs a value close to 1 when candidate data appears to be from reference (training data) distribution, and to output a value close to 0 when candidate data looks like it came from generator network distribution. Generally speaking, generative network generates candidates while discriminative network evaluates them, with contest operating in terms of data distributions. In some embodiments, generator network may learn to map from a latent space to a data distribution of interest, while discriminator network may distinguish candidates produced by the generator network from a true data distribution (e.g., training data). In some cases, generator network's training objective is to increase an error rate of discriminator network (i.e., "fool" the discriminator network by producing novel candidates that the discriminator thinks are not synthesized but, instead, are part of training data). In some cases, a known dataset may serve as initial training data for discriminator network. Training may involve presenting discriminator network with samples from training dataset until it achieves acceptable accuracy. In some cases, generator network may be trained on whether the generator network succeeds in fooling discriminator network. A generator network may be seeded with randomized input that is sampled from a predefined latent space (e.g. a multivariate normal distribution). Thereafter, candidates synthesized by generator network may be evaluated by discriminator network. Independent backpropagation procedures may be applied to both networks so that generator network may produce better samples, while discriminator network may become more skilled at flagging synthetic samples. When used for image generation, generator network may be a deconvolutional neural network, and discriminator may be a convolutional neural network.

Figure 3:
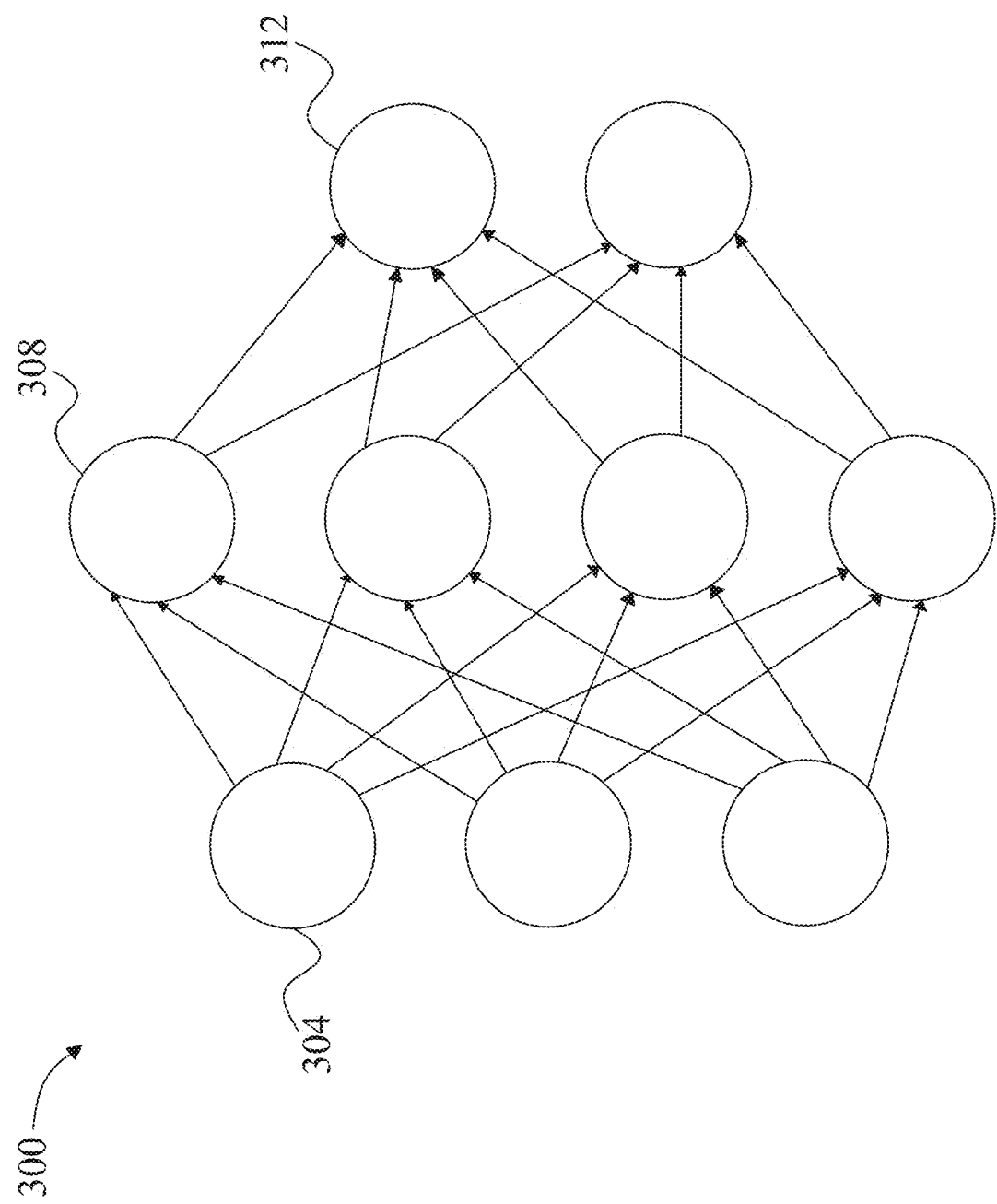
FIG. 3 is a schematic diagram illustrating an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
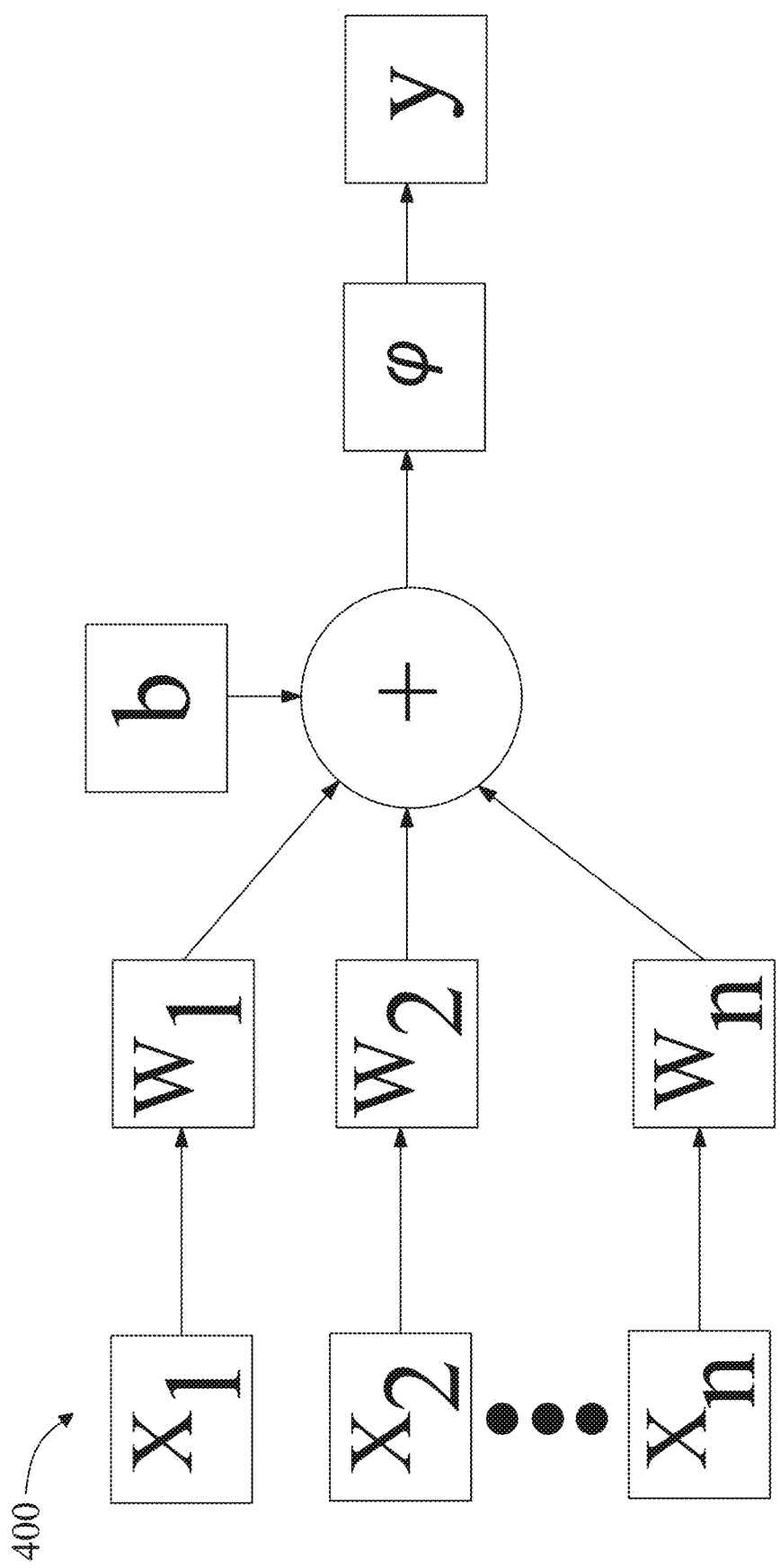
FIG. 4 is a schematic diagram illustrating an exemplary embodiment of a neural network node.

Referring now to FIG. 4, an exemplary embodiment of a node 400 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} \alpha(e^x - 1) & \text{for } x < 0 \\ x & \text{for } x \geq 0 \end{cases}.$$

for some value of a (this function may be replaced and/or weighted by its own derivative in some embodiments), a softmax function such as $$f(x_i) = \frac{e^x}{\sum_i x_i}$$

where the inputs to an instant layer are xi, a swish function such as $f(x) = x*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

With continued reference to FIG. 4, in an embodiment, a neural network may comprise a deep neural network (DNN). As used in this disclosure, a "deep neural network" is defined as a neural network with two or more hidden layers. In a non-limiting example, a neural network may include a convolutional neural network (CNN). A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data through a sliding window approach. In some cases, convolution operations may enable processor 104 to detect local/global patterns, edges, textures, and any other features described herein within input data such as without limitation input data as described above. Spatial features may be passed through one or more activation functions, such as without limitation, Rectified Linear Unit (ReLU), to introduce non-linearities into the processing steps. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the spatial dimensions of spatial feature maps by applying downsampling, such as max-pooling or average pooling, to small, non-overlapping regions of one or more features.

Still referring to FIG. 4, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final outputs of a neural network. Further, each fully connected layer may be followed by one or more dropout layers configured to prevent overfitting, and one or more normalization layers to stabilize the learning process described herein.

Still referring to FIG. 4, a neural network may include a large language model (LLM). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like; training sets may include any material suitable for device data 140, initial data 116, geographical data, and/or other data used as inputs and/or outputs for neural networks and/or machine-learning models as described above. In some embodiments, training sets may include a variety of subject matters, such as nonlimiting examples, medical report documents, electronic health records, entity documents, business documents, inventory documentation, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 4, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 4, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 4, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 4, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 4, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data 120 of a dictionary correlated to a prompt in a training data set. A "context vector," as used herein, are fixed-length vector representations useful for document retrieval and word sense disambiguation.

Still referring to FIG. 4, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive to attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 4, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 4, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 4, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 4, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 4, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 4, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 4, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 4, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 4, decoder may take this output and add it to the decoder inputs. Decoder may continue decoding until a token is predicted. Decoder may stop decoding once it predicts an end token.

Continuing to refer to FIG. 4, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 4, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Still referring to FIG. 4, a non-limiting example of an encoder-only LLM is an LLM implemented using Bidirectional Encoder Representations from Transformers (BERT). In an embodiment, BERT may implement a transformer architecture having an "attention mechanism" configured to dynamically determine and assign weight e.g., importance of different tokens such as text characters, words, or any form of information that may be represented as textual, binary, or other data. Exemplary attention mechanism may include, without limitation, generalized attention self-attention, multi-head attention, additive attention, global attention, and the like. In some cases, transformer architecture may be implemented as an encoder-decoder structure having an encoder configured to map an input sequence to a higher dimensional space i.e., a sequence of continuous representations, and a decoder configured to transform output of the encoder into a final output sequence, such as without limitation an embedding representing a nucleotide sequence. In other cases, transformer architecture may include only an encoder stack. As a non-limiting example, BERT may include a plurality of layers each contains one or more sub-layers, wherein a first sub-layer may include a multi-head self-attention mechanism, and a second sub-layer may include a position-wise fully connected feed-forward network. In some cases, plurality of layers may be identical. In some cases, multi-head self-attention mechanism may configure BERT to focus on different parts of the input sequence when predicting elements of an embedding to be output; for instance, and without limitation, self-attention mechanism may be described by an attention function:

$$\text{Attention}(Q, K, V) = \text{softmax}\left(\frac{QK^T}{\sqrt{d_k}}\right)V$$

Where Q, K, and V represent a set of queries, keys, and values matrices respectively, and $d_k$ is the dimensionality of the keys. In a non-limiting embodiment, in the context of analysis of RNA, a self-attention mechanism may take output of previous layer X and produce outputs C, using weight matrices $W_i^V$ based on query matrix $$Q_i = [q_1^i, \ldots, q_n^i],$$

key matrix $$K_i = [k_1^i, \ldots, k_n^i],$$

and value matrix $$V_i = [v_1^i, \ldots, v_n^i]$$

as follows:

$$C = \text{Concat}(\text{head}_1, \ldots, \text{head}_H)W^o \text{(inner product with the } W \text{ one)}$$

$$\text{head}_i = \text{softmax}\left(\frac{(Q_i)(K_i)^T}{\sqrt{D}}\right)V_i$$

where $$Q_i = XW_i^Q, K_i = XW_i^K, V_i = XW_i^V$$

representing inner products with sets of weights $W_i^Q$, $W_i^K$, and $W_i^V$, which are the weights to be tuned when training BERT. These matrices may be of size D×D that where D is the input and output vector dimension, which may be, as a non-limiting example, 120 elements. In the above-described example, each head may calculate a subsequent hidden state by computing an attention-weighted sum of a value vector v.

In some cases, and still referring to FIG. 4, position-wise fully connected feed-forward network within second sub-layer of each layer may apply a linear transformation to each position separately and identically, for example, and without limitation, position-wise fully connected feed-forward network may be configured to process the output of the attention mechanism according to equation FFN(x)=max(0, xW$_1$+b$_1$) W$_2$+b$_2$, where W$_1$, W$_2$, b$_1$, and b$_2$ are parameters of the feed-forward and x is the input to the feed-forward network. In other words, second sub-layer may include two convolutions with a kernel size 1 and a ReLu activation in between.

With continued reference to FIG. 4, in one or more embodiments, BERT's input representation may combine a plurality of embeddings of tokens, segments, and/or positions. In some cases, each token may be processed, for example and without limitation, through a WordPiece tokenization. Output of BERT may include a fixed-length vector that represents the input token's contextual relationships that suitable for downstream tasks, such as, without limitation, processes describe above. In some cases, implementing BERT for generation of representations of may include pre-training (bidirectionally) which involves one or more unsupervised tasks; for instance, and without limitation, processor 104 may be configured to execute a Masked Language Model (MLM) and a Next Sentence Prediction (NSP). In a non-limiting example, at least a portion of nucleotide sequence in each nucleotide sequence example may be randomly masked, and the model may learn to predict masked nucleotide sequence portions based on the context. NSP may train the model to predict, for example, and without limitation, whether two given subsequences logically follow each other. Additionally, BERT may be fine-tuned to adapt pre-trained representations. In some cases, fine-tuning BERT may include iteratively training BERT's parameters on structural alignment learning and/or masked language model learning with minimal adjustments required from the pre-trained model as described above; for instance, and without limitation, a loss function used for fine-turning may be represented as:

$$L = -\log\left(\frac{e^{s(\text{correct})}}{\sum_j^n e^{s(j)}}\right)$$

Wherein L is the loss, s(correct) is the score of the correct label, and s(j) is the score of each possible label. It should be noted that other exemplary downstream tasks e.g., sentiment analysis, question answering, named entity recognition (NER), among others may be adapted and optimized based on the apparatus 100 and methods described in this disclosure. As a person skilled in the art, upon reviewing the entirety of this disclosure, will be well versed in the model architectures, including multi-head self-attention mechanism and position-wise fully connected feed-forward network as described herein.

Figure 5:
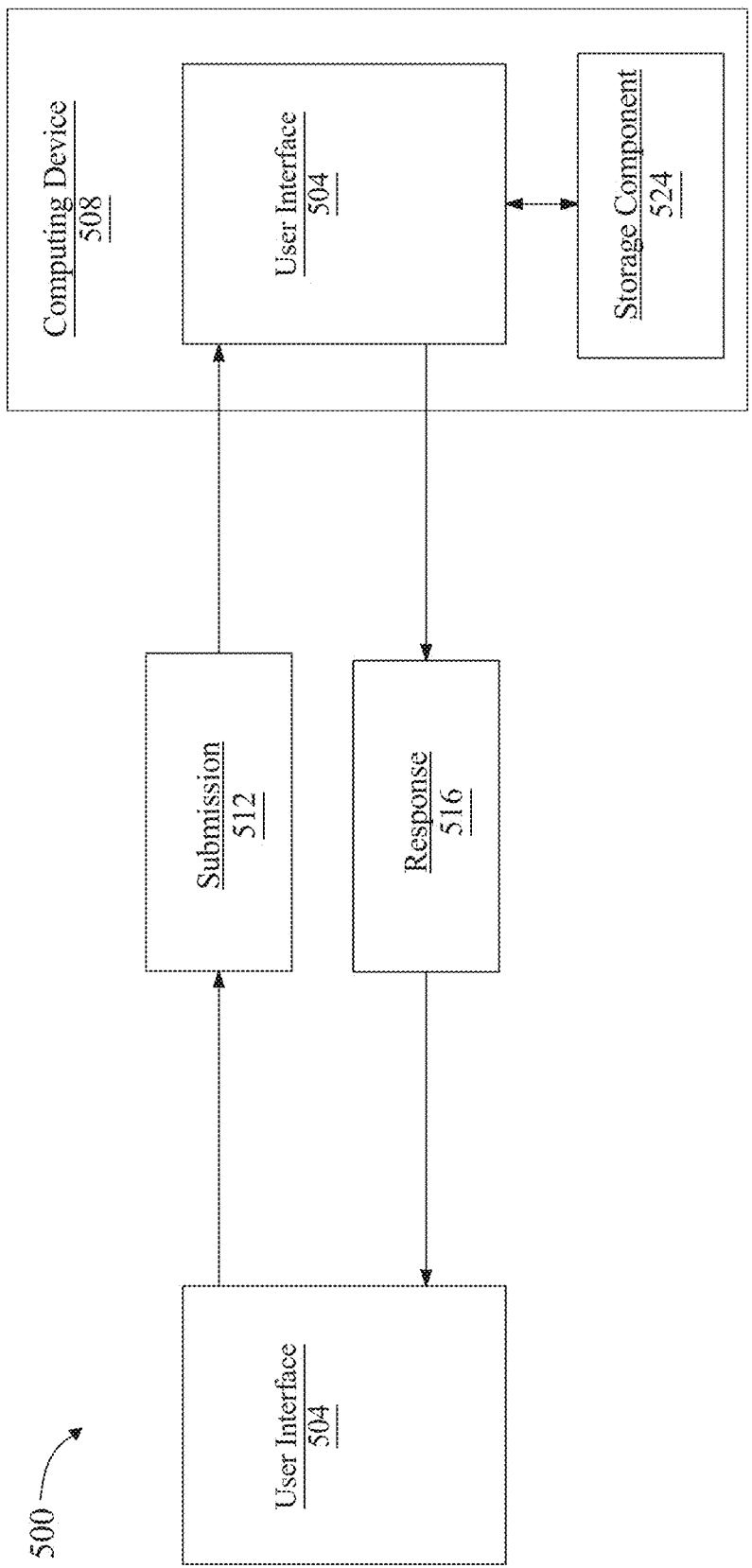
FIG. 5 is a block diagram illustrating an exemplary embodiment of a chatbot.

Referring to FIG. 5, a chatbot system 500 is schematically illustrated. According to some embodiments, a user interface 504 may be communicative with a computing device 508 that is configured to operate a chatbot. In some cases, user interface 504 may be local to computing device 508. Alternatively or additionally, in some cases, user interface 504 may remote to computing device 508 and communicative with the computing device 508, by way of one or more networks, such as without limitation the internet. Alternatively or additionally, user interface 504 may communicate with user device 508 using telephonic devices and networks, such as without limitation fax machines, short message service (SMS), or multimedia message service (MMS). Commonly, user interface 504 communicates with computing device 508 using text-based communication, for example without limitation using a character encoding protocol, such as American Standard for Information Interchange (ASCII). Typically, a user interface 504 conversationally interfaces a chatbot, by way of at least a submission 512, from the user interface 508 to the chatbot, and a response 516, from the chatbot to the user interface 504. In many cases, one or both of submission 512 and response 516 are text-based communication. Alternatively or additionally, in some cases, one or both of submission 512 and response 516 are audio-based communication.

Continuing in reference to FIG. 5, a submission 512 once received by computing device 508 operating a chatbot, may be processed by a processor 520. In some embodiments, processor 520 processes a submission 512 using one or more of keyword recognition, pattern matching, natural language processing, and/or processing using an LLM to classify inputs and/or generate outputs. In some embodiments, processor employs real-time learning with evolutionary algorithms. In some cases, processor 520 may retrieve a pre-prepared response from at least a storage component 524, based upon submission 512. Alternatively or additionally, in some embodiments, processor 520 communicates a response 516 without first receiving a submission 512, thereby initiating conversation. In some cases, processor 520 communicates an inquiry to user interface 504; and the processor is configured to process an answer to the inquiry in a following submission 512 from the user interface 504. In some cases, an answer to an inquiry present within a submission 512 from a user device 504 may be used by computing device as an input to another function, for example without limitation at least a feature or at least a preference input.

Figure 6:
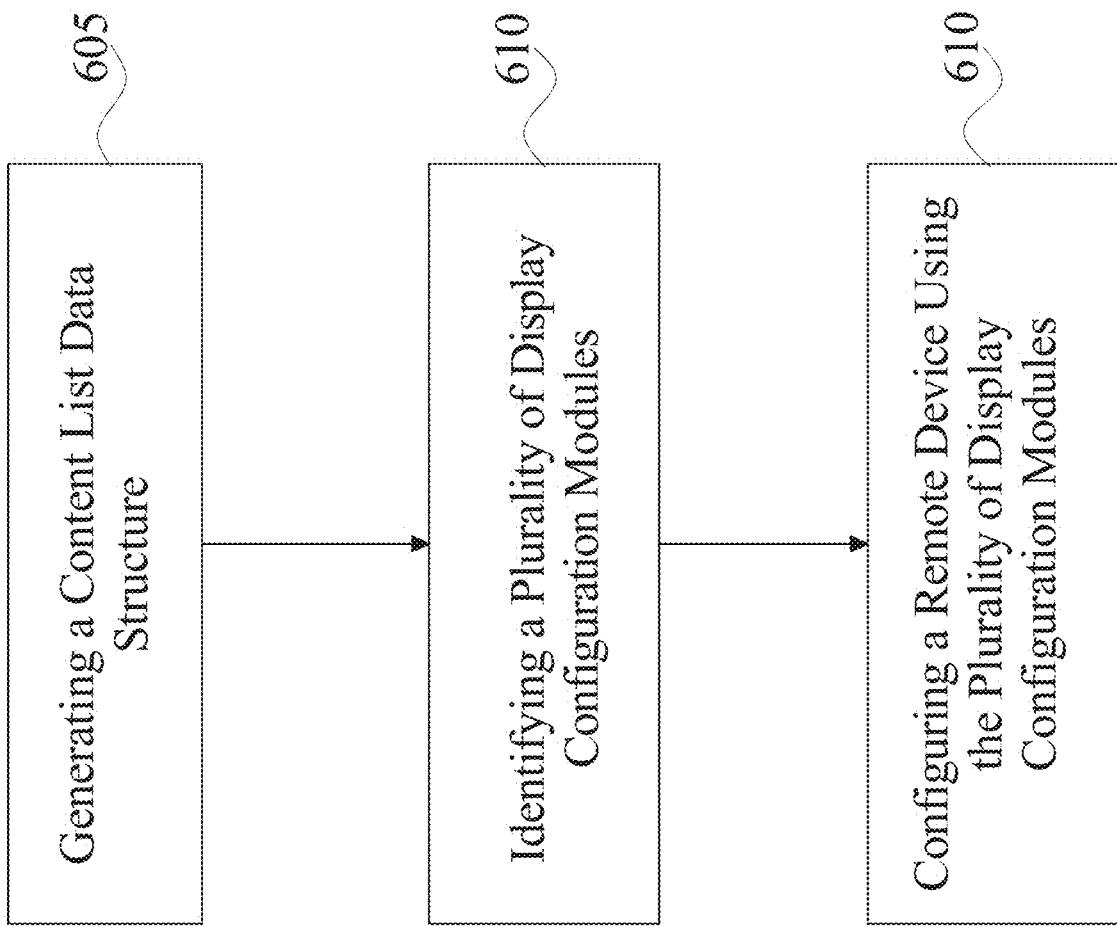
FIG. 6 is a flow diagram illustrating an exemplary embodiment of a method of generating a graphical interface with a dual-layer component.

Referring now to FIG. 6, an exemplary embodiment of a method 600 of generating a graphical interface with a dual-layer component is illustrated. At step 605, at least a processor generates a content list data structure 112 based on at least an element of initial data 116; this may be performed, without limitation, as described above in reference to FIGS. 1-5. Generating content list data structure 112 may include transmitting a query to at least a third-party device 124*a-n* based on initial data 116, receiving textual data 120 from the at least a third-party device 124*a-n*, and generating the content list data structure 112 using the textual data 120. At least a third-party device 124*a-n* may include a plurality of third-party devices 124*a-n*, and generating content list data structure 112 may include determining a first geographical constraint 128*a-n* of remote device 164, determining a second geographical constraint 132*a-n* of a selected third-party device 124*a-n* of the plurality of third-party devices 124*a-n*, and generating the content list data structure 112 using textual data 120 received from the selected third-party device 124*a-n*. Determining a first geographical constraint 128*a-n* may be performed using a geographical constraint neural network 136 and/or machine-learning model as described above; for instance, determining may include training a geographical constraint neural network 136 using training data correlating device data 140 examples to geographical constraint data, detecting device data 140 of remote device 164, and determining the first geographical constraint 128*a-n* using the device data 140 and the geographical constraint neural network 136. Generating content list data structure 112 may include receiving an input from remote device 164 and generating content list data structure 112 using the input. Generating content list data structure 112 may include determining a plurality of overlapping geographical constraints of remote device 164 and generating the content list data structure 112 using the plurality of overlapping geographical constraints. Generating the content list data structure 112 may include generating content list data structure 112 using a trained content list data structure neural network 148 and/or machine-learning device.

At step 610, and still referring to FIG. 6, at least a processor identifies a plurality of display configuration modules 152*a-n* using the content list data structure 112. Plurality of display configuration modules 152*a-n* includes a streaming module 156 and a dialog module 160. Identifying plurality of display configuration modules 152*a-n* may include identifying the plurality of display configuration modules 152*a-n* using a display configuration neural network. Dialog module 160 may include a chatbot.

With continued reference to FIG. 6, at step 615, at least a processor configures a remote device 164 to generate a plurality of display fields, each display field producing an output from an interface-level component of the plurality of interface-level components. Plurality of display fields includes a first display field 168 configured to display an output of the streaming module 156 and a second display field 172 configured to display an output of the dialog module 160 and receive and input to the dialog module 160. Processor may generate an output of the content list data structure 112 and configure the remote device 164 to display the generated output.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
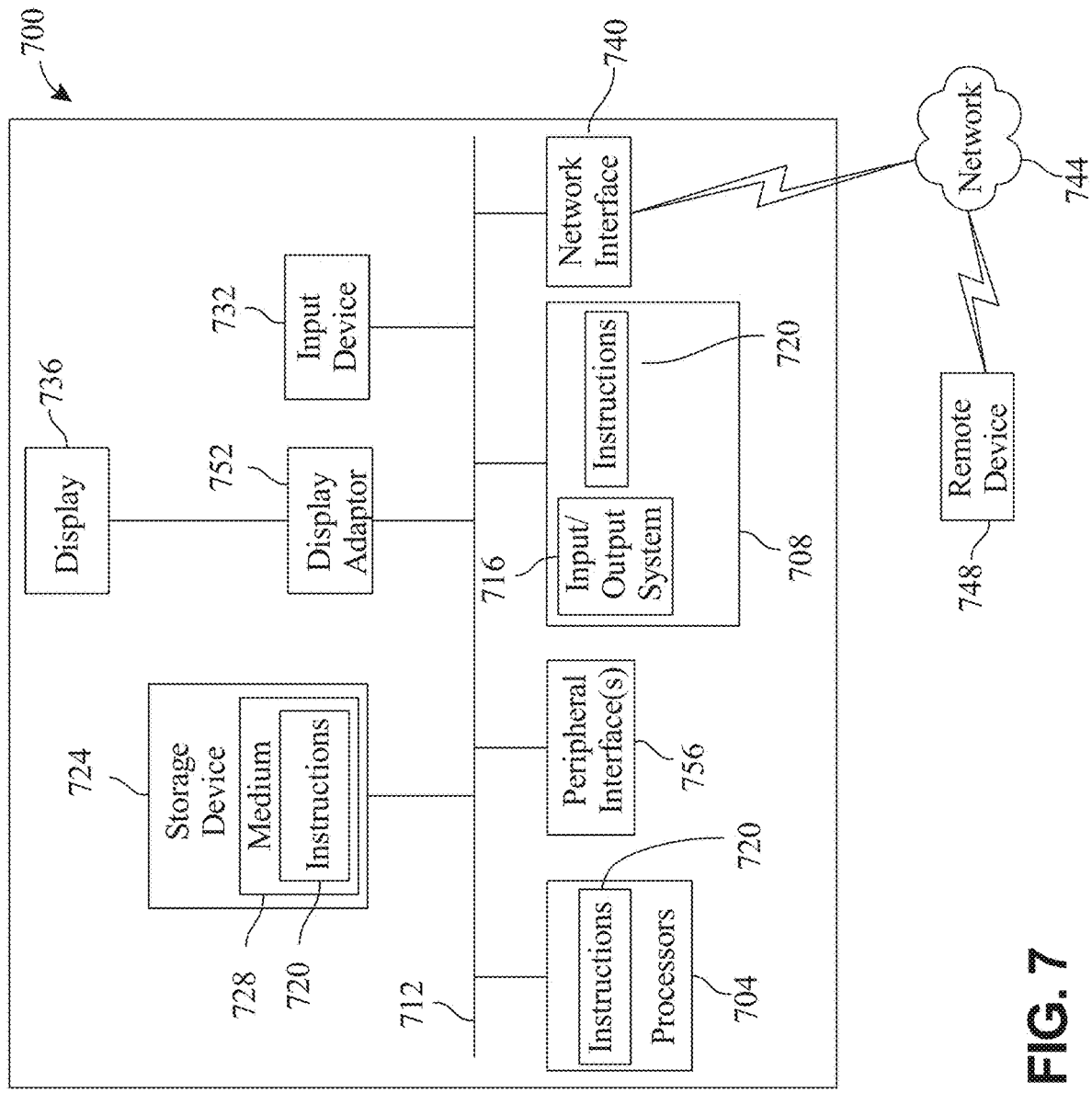
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a graphical interface with a dual-layer component, the apparatus comprising:
   at least a processor; and
   a non-transitory memory communicatively connected to the at least a processor, the non-transitory memory containing instructions configuring the at least a processor to:
      generate a content list data structure comprising a data structure enumerating and/or listing a plurality of elements of data to be conveyed using user interface elements and/or modules based on at least an element of initial data using a trained content list structure neural network, wherein training the content list structure neural network comprises:
         receiving training data correlating content list data structure inputs to content list data structure examples, wherein the content list data structure examples;
         receiving feedback indicated a validity of a generated content list data structure generated using the trained content list structure neural network;
      update the training data as a function of the received feedback;
      retrain the content list structure neural network as a function of the updated training data;
      identify, using the content list data structure generated using the retrained content list structure neural network, a plurality of display configuration modules, wherein the plurality of display configuration modules includes:
         a streaming module; and
         a dialog module; and
      configure a remote device to generate a plurality of display fields, each display field producing an output from an interface-level component of a plurality of interface-level components, wherein the plurality of display fields includes:
         a first display field configured to display an output of the streaming module; and
         a second display field configured to display an output of the dialog module and receive and input to the dialog module,
      wherein generating the content list data structure further comprises:
         determining a plurality of overlapping geographical constraints of the remote device; and
         generating the content list data structure using the plurality of overlapping geographical constraints, wherein a geographical constraint comprises a geographical region and/or location associated with a computing device.

2. The apparatus of claim 1, wherein generating the content list data structure further comprises:
   transmitting a query to at least a third-party device based on the initial data;
   receiving textual data from the at least a third-party device; and
   generating the content list data structure using the textual data.

3. The apparatus of claim 2, wherein the at least a third-party device further comprises a plurality of third-party devices, and generating the content list data structure further comprises:
   determining a first geographical constraint of the remote device;
   determining a second geographical constraint of a selected third-party device of the plurality of third-party devices; and
   generating the content list data structure using textual data received from the selected third-party device.

4. The apparatus of claim 3, wherein determining the first geographical constraint further comprises:
   training a geographical constraint neural network using training data correlating device data examples to geographical constraint data;
   detecting device data of the remote device; and
   determining the first geographical constraint using the device data and the geographical constraint neural network.

5. The apparatus of claim 1, wherein generating the content list data structure further comprises:
   receiving an input from the remote device; and
   generating the content list data structure using the input.

6. The apparatus of claim 1, wherein generating the content list data structure further comprises generating the content list data structure using a trained content list data structure neural network.

7. The apparatus of claim 1, wherein identifying the plurality of display configuration modules further comprises identifying the plurality of display configuration modules using a display configuration neural network.

8. The apparatus of claim 1, wherein the dialog module further comprises a chatbot.

9. The apparatus of claim 1 further configured to:
   generate an output of the content list data structure; and
   configure the remote device to display the generated output.

10. A method of generating a graphical interface with a dual-layer component, the method comprising:
    generating, by at least a processor, a content list data structure comprising a data structure enumerating and/or listing a plurality of elements of data to be conveyed using user interface elements and/or modules based on at least an element of initial data using a trained content list structure neural network, wherein training the content list structure neural network comprises:
       receiving training data correlating content list data structure inputs to content list data structure examples, wherein the content list data structure examples;
       receiving feedback indicated a validity of a generated content list data structure generated using the trained content list structure neural network;
    update the training data as a function of the received feedback;
    retrain the content list structure neural network as a function of the updated training data;
    identifying, by the at least a processor and using the content list data structure generated using the retrained content list structure neural network, a plurality of display configuration modules, wherein the plurality of display configuration modules includes:
       a streaming module; and
       a dialog module; and
    configuring, by the at least a processor, a remote device to generate a plurality of display fields, each display field producing an output from an interface-level component of a plurality of interface-level components, wherein the plurality of display fields includes:

a first display field configured to display an output of the streaming module; and a second display field configured to display an output of the dialog module and receive and input to the dialog module, wherein generating the content list data structure further comprises:

determining a plurality of overlapping geographical constraints of the remote device; and generating the content list data structure using the plurality of overlapping geographical constraints, wherein a geographical constraint comprises a geographical region and/or location associated with a computing device.

11. The method of claim 10, wherein generating the content list data structure further comprises:

transmitting a query to at least a third-party device based on the initial data;

receiving textual data from the at least a third-party device; and generating the content list data structure using the textual data.

12. The method of claim 11, wherein the at least a third-party device further comprises a plurality of third-party devices, and generating the content list data structure further comprises:

determining a first geographical constraint of the remote device;

determining a second geographical constraint of a selected third-party device of the plurality of third-party devices; and generating the content list using textual data received from the selected third-party device.

13. The method of claim 12, wherein determining the first geographical constraint further comprises:

training a geographical constraint neural network using training data correlating device data examples to geographical constraint data;

detecting device data of the remote device; and determining the first geographical constraint using the device data and the geographical constraint neural network.

14. The method of claim 10, wherein generating the content list data structure further comprises:

receiving an input from the remote device; and generating the content list data structure using the input.

15. The method of claim 10, wherein generating the content list data structure further comprises generating the content list data structure using a trained content list data structure neural network.

16. The method of claim 10, wherein identifying the plurality of display configuration modules further comprises identifying the plurality of display configuration modules using a display configuration neural network.

17. The method of claim 10, wherein the dialog module further comprises a chatbot.

18. The method of claim 10 further comprising:

generating an output of the content list data structure; and configuring the remote device to display the generated output.

* * * * *